UNITED STATES PATENT OFFICE.

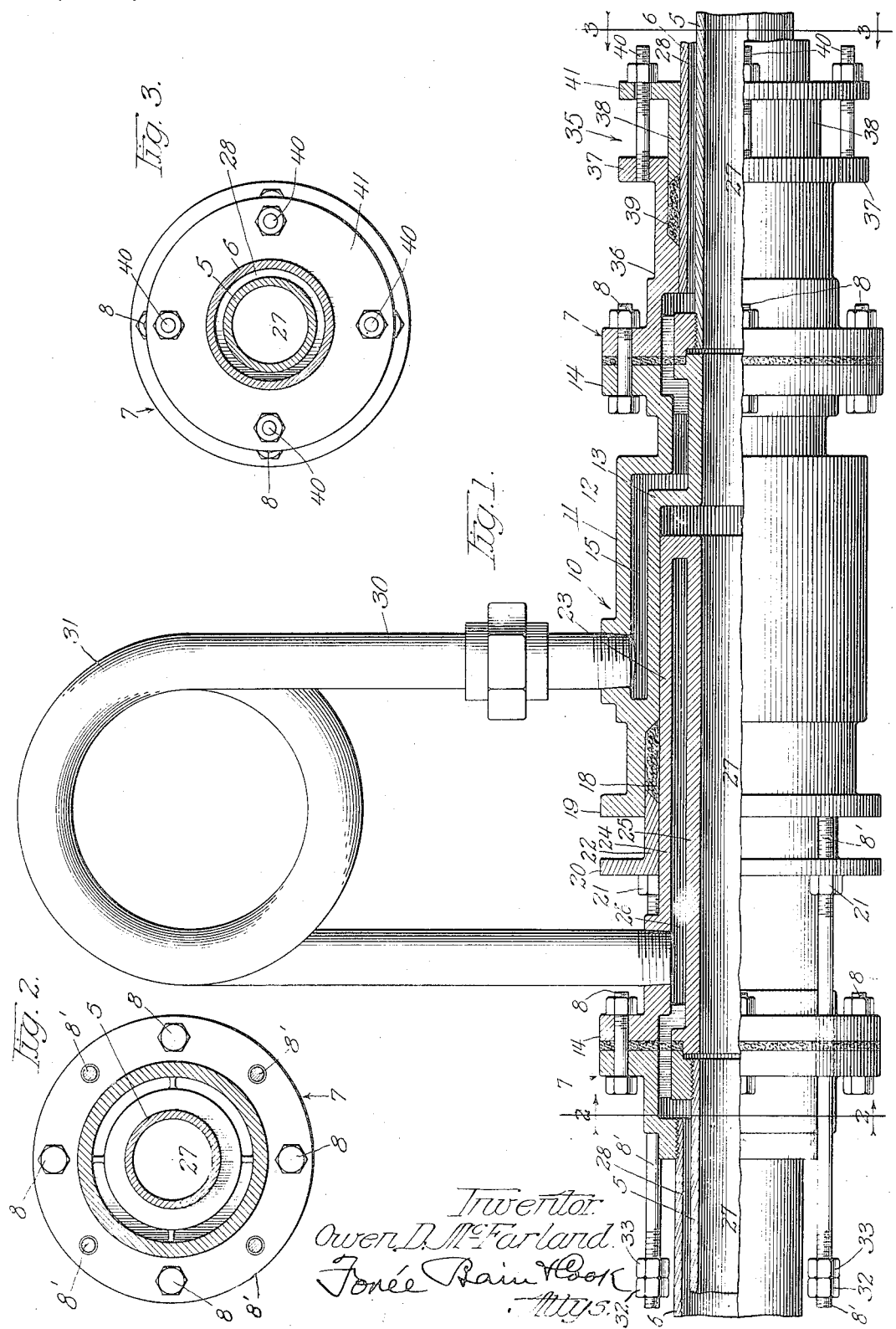

OWEN D. McFARLAND, OF CHICAGO, ILLINOIS, ASSIGNOR TO GUYTON & CUMFER MANUFACTURING COMPANY, OF CHICAGO, ILLINOIS, A CORPORATION OF ILLINOIS.

EXPANSION-JOINT.

1,288,631.      Specification of Letters Patent.      Patented Dec. 24, 1918.

Application filed April 26, 1918. Serial No. 230,890.

*To all whom it may concern:*

Be it known that I, OWEN D. McFARLAND, a citizen of the United States, residing at Chicago, in the county of Cook and State of Illinois, have invented certain new and useful Improvements in Expansion-Joints, of which the following is a specification.

My invention relates to improvements in expansion joints for double conduit systems.

In double conduit systems, especially in such in which fluids of different temperatures and viscosity are to be conducted, it is necessary to provide expansion joints, at frequent intervals, to compensate for the relative expansion and contraction of the concentrically arranged pipes constituting the conduit.

In pipes in which a slow moving viscous material, such for example as asphaltum, or the like, is to be conveyed, it is advantageous to surround such pipes by larger concentrically-arranged pipes, and introduce a relatively hot medium between the pipes, such for example, as steam, whereby to increase the temperature of the inner medium, to thereby render it more limpid, that it may be caused to flow with greater freedom through the inner pipe.

In the accompanying drawings, forming part hereof, I have shown two kinds of expansion joints, of the same type, but one is adapted to compensate for a larger variation in axial dimensions of the pipes, than the other. In both cases, however, the compensation is made in the outer pipe line for mechanical reasons and because the parts are then more accessible for adjustment and repair.

In the embodiment of the exemplification depicted by the drawings:—

Figure 1 shows a double conduit, containing two expansion joints, parts of which are in elevation, part in section.

Fig. 2 is a transverse section taken on line 2—2 of Fig. 1.

Fig. 3 is a transverse section taken on line 3—3 of Fig. 1.

In all the views the same reference characters are employed to indicate similar parts.

The conduit system consists of a series of inner sections of pipe 5 and outer sections 6. The inner conduit is for conducting the slow moving, viscous material and the outer conduit, between the two pipes, is intended to convey steam for the purpose of heating the relatively viscous materials to thereby raise its temperature and enhance its movement. The conduit sections are connected together by a single flange 7, with a single series of bolts 8. The larger expansion joint 10, which permits of very considerable relative axial movement of the outer pipe system with respect to the inner pipe system, consists of a member 11 having double concentric walls 12 and 13. These walls are integral parts of the flange 14, and provide a stem space 15 therebetween. And projecting radially from this extension is a flange 19 in which the stud bolts 8' are secured. A gland 20 is movable axially and is held in place by the nuts 21, that surround the stud bolts 8'. The inner end of the cylindrical portion 22 of the gland, bears upon the packing 18 to make a perfectly tight joint between the member 11 and another similar telescopically-associated member 23. The member 23 is provided with inner walls 25 and an outer concentric wall 24, having a steam face 26 therebetween. The inner diameter of the wall 25 is substantially the same as the inner diameter of the pipe 5 so as to provide an uninterrupted conduit 27 therein. The conduit 28 is annular in form, and is contained between the pipes 5 and 6, and is continued through the steam spaces 15 and 26 that the members 11 and 23 provide. Communication between the conduit 28 and the space 15 is through the flange coupling 7, and between the steam space 26 and the steam space 28.

The conduit members 11 and 23 are telescopically arranged so that they may be moved axially with respect to each other. The steam spaces 15 and 26 may be connected together by any well known means. In this particular instance I have found a pipe 30 made more or less flexible, as by a coil 31, satisfactorily serves the purpose.

It will be observed that every part of the conduit 5 is surrounded by a steam space and that the steam spaces 15 and 26 extend between the terminals of the pipe 30. Instead of using a pipe 30, a hose or other means may be employed, so as to provide a means for the steam to pass from the steam space 15 in one member of the expansion joint to the steam space 26 in the other member without interfering with the relative movement of the joint members.

The bolts 8' extend from the flange 20 and pass through the flanges 7 and 14, on the left of Fig. 1, and serve as guides. The nuts 32 and 33, on the outer ends of the bolts, serve as stops to limit the axial movement of the expansion joint members 11 and 26.

There is supposed to be a plural number of such expansion joints in a given line of pipe and when a given joint is expanded to the extreme extent permissible by the nuts 32 and 33, further expansion in the system will be taken up by another joint, that has not reached the limit of its movement.

An expansion joint 35, capable of less axial movement, consists of a cylindrical extension 36 having a flange 37 in the gland 38, between which cylinder and the gland is a suitable packing ring 39. A stud 40 projects from the flange 37 and passes through the flange 41 of the gland 38 and serves as a means for compressing the packing, supplied by the ring 39.

While I have herein shown a single embodiment of my invention, for the purpose of clear disclosure, it is manifest that changes may be made in the general arrangement and configuration of the parts within the scope of the appended claims.

Having described my invention, what I claim is:—

1. In a double conduit system, an expansion joint providing two telescopically-engaging double-wall concentrically parallel sections axially movable with respect to each other to compensate for variation in length of said conduits due to heat.

2. In a double conduit system, an expansion joint comprising two telescopically-engaging axially movable double-wall concentric, parallel sections; means for connecting the spaces between the respective walls together and a packing ring between the sections.

3. In a double wall conduit system, an expansion joint comprising two telescopically-engaging axially movable double-wall sections; a flexible conduit connecting the space between said walls together and a packing ring overlying one section and within a packing space in the other section.

4. In a double conduit system, an expansion joint comprising two telescopically-engaging double-wall axially movable sections and a single flange at one end, of each section, whereby to connect said respective sections to a double conduit system.

5. In a double pipe conduit system comprising inner and outer concentrically arranged pipes; a single flange having separated openings, one opening in the center for the inner pipe, the other opening radially beyond the center for connection with the space between said pipes; an expansion joint providing two telescopically-engaging double-wall sections larger in diameter than the connected conduits, each section provided with a flange, of the character described; a flexible means for connecting the spaces between said double walls of said expansion joint together, in combination with double pipe conduit sections having similar flanges for connection to the flanges of said joints.

In testimony whereof I hereunto set my hand.

OWEN D. McFARLAND.